United States Patent Office 3,505,286
Patented Apr. 7, 1970

3,505,286
STABILIZATION OF RIGID
POLY(VINYL CHLORIDE)
Matthew Peter Digiaimo, Old Bridge, N.J., assignor to American Cyanamid Company, Stamford, Conn., a corporation of Maine
No Drawing. Continuation-in-part of application Ser. No. 647,351, June 20, 1967. This application Feb. 17, 1969, Ser. No. 799,926
Int. Cl. C08f 45/60
U.S. Cl. 260—45.75       8 Claims

ABSTRACT OF THE DISCLOSURE

The stabilization of rigid poly(vinyl chloride) by incorporation therein of a stabilizer comprising (a) a heteropolycarbamylalkane and (b) an ultraviolet light absorber, the mixture of (a) and (b) being present in a concentration of 0.2 to 6.0% based on the weight of the rigid poly(vinyl chloride). In the preferred embodiments, a heat stabilizer is also used.

---

This application is a continuation-in-part of application Ser. No. 647,351, filed June 20, 1967, which was, in turn, a continuation-in-part of application Ser. No. 386,433, filed July 30, 1964, both of which are now abandoned.

This invention relates to the stabilization of rigid poly (vinyl chloride) against degradation by light and, in the preferred embodiments, against degradation by heat also. It relates further to the resulting stabilized rigid poly (vinyl chloride).

For convenience, "poly(vinyl chloride)" will be referred to throughout the specification as "PVC." As used in this application, the expression "rigid" PVC is intended to mean a vinyl chloride polymeric composition having no plasticizer. "Rigid" PVC is to be distinguished from "flexible" PVC which is PVC containing a significant amount of plasticizer.

The sensitivity to light and heat of both flexible and rigid PVC compositions has been recognized and, to some extent, dealt with, by incorporating in the polymeric compositions to be stabilized, effective amounts of heat stabilizers and/or light stabilizers. Recently, the art of stabilizing PVC was advanced by the use, in combination, of members of a specific class of heat stabilizers and members of a specific class of light stabilizers. Thus, in U.S. Patent 2,912,411, there is disclosed a means of stabilizing PVC compositions by the incorporation therein of a phosphoric amide (as a light stabilizer) and a conventional heat stabilizer (e.g., sodium carbonate, cadmium ricinoleate, or an organic epoxy hydrochlorophyl). While there is no definite statement in this patent by which it is expressly limited to the stabilization of flexible PVC, it is noted that, in the examples of this patent, the PVC is in all cases plasticized with dioctyl phthalate. An attempt to stabilize rigid PVC in accordance with this teaching leads to discouraging results. Without any plasticizer, heat-stabilized, rigid PVC responds only slightly to the stabilizing effect of the phosphoric triamide. Thus, rigid PVC (i.e., PVC without plasticizer) is made only a bit more light stable as compared with PVC having only the heat stabilizer alone. The increase in stability is only slight and hardly makes the addition of the extra component worth the expense.

TABLE I.—RIGID PVC

| Additive Name | Conc. (wt. percent) | U.V. exposure hours for $\Delta Y.I.=15$ |
|---|---|---|
| Control | | (¹) |
| Organo-tin-mercaptide (Thermolite 31)² | 2 | 130 |
| Organo-tin-mercaptide (Thermolite 31) and Hexamethylphosphoric triamide | 2<br>0.5 | 185 |

¹ Degrades on mill.
² A commercially available di-n-butyl tin bis(isooctyl mercapto acetate).

This particular light stabilizer, found to be very useful for plasticized PVC, is of only slight use in rigid PVC. In view of this finding, it is an object of the present invention to provide a stabilizing combination which is capable of increasing the stability to light of rigid PVC. It is a further object to provide the stabilized rigid PVC composition obtained by using the stabilizer of this invention.

These and other objects are accomplished herein with great effectiveness and in a surprisingly simple manner. In accordance with the present invention, rigid PVC, which may optionally contain a conventional heat stabilizer, is made stable to light by the addition of 0.2 to 6.0%, based on the weight of the rigid PVC, of a light stabilizer having the following two components:

(1) A heteropolycarbamylalkane of the following Formula I:

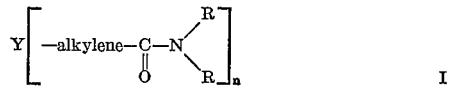

I wherein R is hydrogen or alkyl of 1–18 carbons which may be substituted with a cyano or a hydroxyl group; "alkylene" is of 1–3 carbons; Y is imino, alkylimino, sulfur or phosphinylidyne (P=O) and n is either 2 or 3, depending on the valence of Y; and (2) An ultraviolet light absorber.

It is indeed surprising that the stabilizer of this invention is as effective as it is since the component of Formula I, by itself, provides very little or no added stability to rigid PVC. The same component along with an ultraviolet absorber provides a degree of stability which was not attainable with either component alone.

Examples of suitable heteropolycarbamylalkanes of Formula I are:

(1) Iminobis(alkanamides) such as: 3,3'-iminobis(propionamide), 3,3'-iminobis[N - (2 - cyanoethyl)propionamide], 3,3' - iminobis(2 - methylpropionamide), 3,3'-iminobis(N - dodecylpropionamide), 3,3'-iminobis[N-(2-hydroxyethyl)propionamide], 3,3' - iminobis[N,N-di-(2-hydroxyethyl)propionamide], 3,3'-iminobis(N,N-dimethylpropionamide) and 2,2'-iminobisacetamide;

(2) 3,3'-lower alkyliminobis(alkanamides) such as: 3,3' - methyliminobispropionamide, 3,3'-butyliminobispropionamide and 3,3' - methyliminobis(N-dodecylpropionamide);

(3) Thiobis(alkanamides) such as: 3,3' - thiobispropionamide, 4,4'-thiobisbutyramide, 3,3'-thiobis(N-dodecylpropionamide), 3,3'-thiobis[N-(2-hydroxyethyl)propionamide], 3,3' - thiobis[N,N - di(2 - hydroxyethyl)propionamide], 2,2'-thiobisacetamide and 3,3'-thiobis(2-methylpropionamide); and (4) 3,3',3''-phosphinylidyne tris(propionamides) such as: 3,3',3''-phosphinylidyne tris(propionamide), 3,3',3''- phosphinylidynetris(N-dodecylpropionamide) and 3,3′,3″-phosphinylidynetris(N,N-dimethylpropionamide).

The ultraviolet absorbers which may be used in conjunction with the heteropolycarbamylalkanes may be selected from the following classes of ultraviolet absorbers:

(A) 2-hydroxybenzophenones: Especially 2-hydroxybenzophenones with at least one additional substituent, for example, 2-hydroxy-4-methoxybenzophenone, 2,4-dihydroxybenzophenone, 2,2′ - dihydroxy - 4-methoxybenzophenone, 2,2′,4,4′ - tetrahydroxybenzophenone, 2,2′ - dihydroxy - 4,4′ - dimethoxybenzophenone, 2 - hydroxy - 4-butoxybenzophenone, 2 - hydroxy-4-octoxybenzophenone, 2-hydroxy-4-dodecyloxybenzophenone, 2,2′ - dihydroxy-4-octoxybenzophenone, 4′-chloro-2-hydroxy-4-octoxybenzophenone, etc. This category of ultraviolet absorber is described in U.S. Patents 2,777,838 issued Jan. 15, 1957, 2,682,559 issued June 29, 1954, 2,693,492 issued Nov. 2, 1954, 2,861,053 issued Nov. 18, 1958, 2,919,259 issued Dec. 29, 1959, 2,976,259 issued Mar. 21, 1961, 3,006,959 issued Oct. 31, 1961 and 3,098,842 issued July 23, 1963.

(B) Benzotriazoles: Especially the 2-(2-hydroxyphenyl) benzotriazoles such as 2 - (2 - hydroxy-5-methylphenyl) benzotriazole, 2-(2-hydroxy-5-octylphenyl)benzotriazole, 2-(2-hydroxy-4-methoxyphenyl)benzotriazole, 2 - (2 - hydroxy-3-t-butyl-5-methylphenyl)benzotriazole, 2 - (2 - hydroxy-3,5-di-t-butylphenyl)benzotriazole, 2-(2-hydroxy-3, 5 - di - t-amylphenyl)benzotriazole, 2-(2-hydroxy-3,5-di-t-butylphenyl)-5-chlorobenzotriazole, 2 - (2 - hydroxy - 3-t-butyl-5-methylphenyl)-5-chlorobenzotriazole, etc. This class of ultraviolet absorbers is described in U.S. Patents 3,004,896 issued Oct. 17, 1961, 3,018,269 issued Jan. 23, 1962 and 3,271,339 issued Sept. 6, 1966.

(C) Aromatic esters: Phenyl salicylate, tertiarybutylphenyl salicylate, phenyl resorcylate, p-octylphenyl benzoate, bis(p-nonylphenyl isophthalate, bis(p-nonylphenyl) terephthalate, etc. Such aromatic esters are typically described in U.S. Patent 3,146,217 issued Aug. 25, 1964.

(D) Triazines: Especially triazines having at least one o-hydroxyphenyl substituent such as 2,4,6-tris(2-hydroxy-4-octyloxyphenyl)-s-triazine, 2-(2-hydroxy - 4 - octyloxyphenyl-4,6-dixylyl-s-triazine, etc. Such triazines are described in U.S. Patents 3,118,887 issued Jan. 21, 1964, 3,293,247 and 3,293,249, both of which issued Dec. 20, 1966.

(E) Benzothiazoles and benzothiazolines: 2-anilinobenzothiazole, 2-(N-methylanilino)benzothiazole, 2-(4-methoxyanilino)benzothiazole, 2 - (2 - methoxyphenylimino) - 3 - ethylbenzothiazoline, 2 - phenylimino-3-ethylbenzothiazoline and 2-(beta naphthylimino)benzothiazoline, etc.

(F) Benzylidine-malonic esters: Diethyl p-methoxybenzylidenemalonate, diethyl o-methoxybenzylidenemalonate, diethyl p-hydroxybenzylidenemalonate, diethyl diphenylmethylenemalonate, etc. This specific class of ultraviolet absorbers is disclosed in copending application Ser. No. 389,210 filed Aug. 12, 1964 and now abandoned. Additional ultraviolet absorbers of the benzylidene type are also disclosed in U.S. Patent 3,244,668 issued Apr. 5, 1966.

(G) Arylaminoethylenes: Especially N-methyl-p-methoxyanilinomethylenemalonitriles such as diphenylaminomethylenemalononitrile and N-methyl-p-methoxyanilinomethylenemalononitrile. This class of ultraviolet absorbers is more fully disclosed in U.S. Patent 3,079,366 issued Feb. 26, 1963.

(H) Guanidines: Especially 1,2-dibenzoyl-3-arylguanidines such as 1,2-dibenzoyl-3-(p-methoxyphenyl)guanidine; 1,2-dibenzoyl-3-(p-chlorophenyl)guanidine; 1,2-di - (p-methoxybenzoyl)-3-(p-methoxyphenyl)guanidine, etc. These ultraviolet absorbers are disclosed more fully in copending application Ser. No. 386,386 filed July 30, 1964, and now abandoned.

(I) Cyanoacrylonitrile and cyanoacrylic acid derivatives: Especially aryl substituted compounds such as beta-(diphenyl)-alpha-cyanoacrylic acid ethyl ester, beta-(diphenyl)-alpha-cyanoacrylic acid octyl ester, alpha-phenylbenzylidenemalononitrile, diphenylbenzylidene - malononitrile, etc. This type of ultraviolet absorber is more fully disclosed in U.S. Patents 3,074,971 issued Jan. 22, 1963, 3,085,097 issued Apr. 9, 1963, 3,111,417 issued Nov. 19, 1963, 3,149,146 issued Sept. 15, 1964, 3,215,724 issued Nov. 2, 1965 and 3,278,448 issued Oct. 11, 1966.

Any ultraviolet absorber can be used for the purposes of the present invention so long as it performs the functions generally required of an ultraviolet light absorber. These functions are well-known to be absorbency in the region of about 300–400 millimicrons, low absorbency above about 400 millimicrons, solubility in and compatibility with polymers and stability to light and heat. This invention is not limited to the use of the above named types and embraces the use of all types of ultraviolet absorbers.

The amount of ultraviolet absorber should be between 0.1 and 2.0%, preferably between 0.2 and 1.0%, based on the weight of the rigid PVC. The amount of the compound of Formula I to be used should be between 0.1 and 5.0%, preferably between 0.2 and 3.0%, based on the weight of the PVC. As will be noted, the heteropolycarbamylalkane concentration can be, and preferably should, be equal to the concentration of the ultraviolet absorber.

It should be noted that the invention also contemplates, in its preferred embodiments, the stabilization of PVC against degradation by both heat and light such as might be encountered during normal usage of articles manufactured from PVC. Other heat stabilizers may be necessary to prevent PVC from being degraded by high temperatures required for milling, molding and compounding the PVC if such are utilized. The heat stabilizers which are useful for this purpose can be any of the conventionally available types. While rigid PVC is always processed commercially in the presence of a heat stabilizer and the same types are useful herein in normally effective amounts, use of such heat stabilizers are not necessary to obtain the benefits of this invention. Most heat stabilizers are organo-metallic compounds. However, inorganic compounds such as sodium carbonate are also useful. Among the heat stabilizing organo-metallic compounds are the organo-tin compounds (dibutyl tin dimaleate, dibutyl tin dilaurate, dibutyl tin thioglycolic acid octyl ester, di-n-butyl tin bis-(isooctyl mercapto acetate)); the cadmium or barium salts (barium stearate, cadmium stearate, barium ricinoleate, cadmium ricinoleate, barium octylphenolate); and the organic hydrochlorophyl (acid acceptor) of the epoxy type (epoxidized soybean oil, methyl epoxystearates). A more complete listing of such heat stabilizers is disclosed in Chevassus et al., The Stabilization of Polyvinyl Chloride, Arnold Publ. Ltd., London (1963), pp. 343–374.

When used with a heat stabilizer, the light stabilizer of the present invention may be added as a whole to the rigid PVC or the components may be added separately. Generally, the heat stabilizer is the first to be put into the PVC, and the light stabilizers are then incorporated into this blend by conventional milling procedures. After thorough blending, the PVC can then be shaped into a film or other article of manufacture by compression-molding, extrusion, injection-molding, calendering, etc.

Other additives may be employed to modify the rigid PVC for the intended application. Among such additives are fillers, antistatic agents, pigments, dyes, etc.

The following examples, in which parts and percentages are on the basis of weight, are presented to further illustrate the present invention.

EXAMPLE 1

Films of 50-mil. thickness are prepared from a non-plasticized PVC composition containing 2.0% of a commercial organo-tin-mercaptide (Thermolite 31) as heat stabilizer. All but the control sample are formulated to contain additional additives. The films are exposed to ultraviolet light using a Fluorescent Sunlamp-Blacklight (FS–BL) lamp. The exposure is continued until the tested sample shows a change in yellow index (Y.I.) of 15. This increase in yellow color is determined on a differential colorimeter ("Colormaster") using the following formula (see Example 8, U.S. Patent No. 3,079,366):

$$\text{Yellow Index} = 70 \left(1 - \frac{\text{Blue}}{\text{Green}}\right)$$

The following additives were used in this test:

Additive A—2-hydroxy-4-methoxybenzophenone
Additive B—3,3'-(methylimino)bis N-dodecylpropionamide
Additive C—3,3'-3''-phosphinylidyne tris(propionamide)

The results are given in Table II.

TABLE II

| No. | Additive Name | Percent | FS–BL exposure (hours) to Δ Y.I. of 15 |
|---|---|---|---|
| 1 | None | | 130 |
| 2 | A | 0.5 | 420 |
| 3 | A<br>B | 0.5<br>0.5 | 760 |
| 4 | A<br>C | 0.5<br>0.5 | 850 |

Other stable PVC compositions can be obtained by following the procedure of Example 1 except for the use of other heteropolycarbamylalkanes such as: 3,3'-thiobis(propionamide), N-methyliminobis(N - dodecylpropionamide), 3,3' - iminobis(N,N - dicyanoethylpropionamide) and 3,3'-iminobis[(N,N-dihydroxyethyl)propionamide].

Similarly, instead of the 2-hydroxy-4-methoxybenzophenone U.V. absorber used in Example 1, others may have been used instead, such as: 2-(2-hydroxy-5-methylphenyl)benzotriazoles, diethyl p-methoxybenzylidenemalonate, N - methylanilinomethylenemalononitrile, 2,4,6-tris(2-hydroxy-4-octyloxyphenyl)-s-triazine and p-t-octylphenyl salicylate.

EXAMPLE 2

Five PVC films were prepared without any heat stabilizer present. One film was utilized as a control and had no additive present. A second film contained 1.0% of Additive C (3,3',3''-phosphinylidyne trispropionamide). The third and fourth films contained 0.5% and 1.0%, respectively, of Additive A (2-hydroxy-4-methoxybenzophenone). The fifth film (in accordance with the present invention) contained 0.5% of Additive C plus 0.5% of Additive A. Each film was compression molded directly from the homopolymer powder (after dry blending a portion of the powder with the appropriate additive or additives where used). The five films were then exposed to ultraviolet light using a Fluorescent Sunlamp-Blacklight (FS–BL) lamp for 75 hours and the change in yellow index was measured using a differential colorimeter ("Colormaster") as in Example 1. The results are shown below in Table III.

TABLE III

| Description | Initial Y.I. | Δ Y.I. on exposure for 75 hours |
|---|---|---|
| Control, no additive | 4+ | 36 |
| PVC+1.0% additive C | 4 | 36 |
| PVC+0.5% additive A | 4 | 15 |
| PVC+1.0% additive A | 4 | 6+ |
| PVC+0.5% additive C+0.5% additive A | 4+ | 9 |

This example shows that, in the absence of a heat stabilizer, the amide alone produced no light stabilizing effect but that, when used in combination with an ultraviolet light absorber the greatly enhanced light stabilizing effect of the present invention was obtained.

In total, these examples clearly demonstrate the beneficial light stabilizing effect of the stabilizer combinations of the present invention in rigid PVC in the presence of and in the absence of heat stabilizers.

I claim:

1. Rigid poly(vinyl chloride) stabilized against the deteriorating effects of heat and light by having incorporated therein:

(a) a compound of the formula:

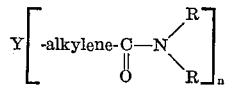

wherein Y is a member selected from the group consisting of imino, N-alkylimino of 1–18 carbons, thio, and phosphinylidyne; "alkylene" is a radical of 1–3 carbons; R is a member selected from the group consisting of hydrogen, alkyl of 1–18 carbons, lower cyanoalkyl and lower hydroxyalkyl; and $n$ is a whole number between 1 and 4; and (b) an ultraviolet absorber, said ultraviolet absorber being a compound which is characterized by absorbency of light in the region of 300–400 millimicrons and low absorbency of light above 400 millimicrons and also by solubility in and compatibility with poly(vinyl chloride) and stability to light and heat, the mixture of (a) and (b) being present in a concentration of 0.2 to 6.0%, based on the weight of the rigid poly(vinyl chloride).

2. Rigid poly(vinyl chloride) in accordance with claim 1 having incorporated therein, a mixture of 3,3'-(methylimino) - bis - N - dodecylpropionamide and 2 - hydroxy-4-methoxy-benzophenone.

3. Rigid poly(vinyl chloride) in accordance with claim 1 having incorporated therein, a mixture of 3,3'3''-phosphinylidyne trispropionamide and 2-hydroxy-4-methoxybenzophenone.

4. The composition of claim 1 wherein the rigid poly(vinyl chloride) contains a heat stabilizer.

5. The composition of claim 4 wherein the heat stabilizer is an organo-metallic compound.

6. The composition of claim 5 wherein the organo-metallic compound is an organo tin compound.

7. The composition of claim 4 wherein the ultraviolet absorber is a 2-hydroxybenzophenone.

8. The composition of claim 4 wherein the ultraviolet absorber is a 2-(2-hydroxyphenyl)benzotriazole.

References Cited

UNITED STATES PATENTS 2,464,855  3/1949  Duggan et al. _____ 260—23 XR

DONALD E. CZAJA, Primary Examiner

M. J. WELSH, Assistant Examiner

U.S. Cl. X.R.

260—23, 45.8, 45.85, 45.9